United States Patent
Sheehan

(10) Patent No.: US 8,930,550 B2
(45) Date of Patent: Jan. 6, 2015

(54) SELECTABLE NON-INTERACTIVE ENTITY APPLICATION PROXY METHOD AND SYSTEM

(75) Inventor: Alexander Brantley Sheehan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1612 days.

(21) Appl. No.: 12/045,741

(22) Filed: Mar. 11, 2008

(65) Prior Publication Data

US 2009/0234954 A1    Sep. 17, 2009

(51) Int. Cl.
| G06F 15/16 | (2006.01) |
| G06F 21/62 | (2013.01) |
| G06F 15/173 | (2006.01) |
| G06F 21/64 | (2013.01) |

(52) U.S. Cl.
CPC .......... *G06F 21/629* (2013.01); *G06F 21/64* (2013.01); *G06F 21/62* (2013.01); *G06F 21/645* (2013.01); *G06F 21/6281* (2013.01)
USPC .......................................... 709/228; 709/225

(58) Field of Classification Search
CPC ....... G06F 21/62; G06F 21/629; G06F 21/64; G06F 21/645; G06F 21/6281
See application file for complete search history.

(56) References Cited

U.S. PATENT DOCUMENTS

| 6,449,643 B1 | 9/2002 | Hyndman et al. |
| 6,453,339 B1 | 9/2002 | Schultz et al. |
| 6,609,198 B1 | 8/2003 | Wood et al. |
| 8,046,826 B2 | 10/2011 | Sheehan |
| 8,176,540 B2 | 5/2012 | Sheehan |
| 8,806,601 B2 | 8/2014 | Sheehan |
| 2003/0005178 A1 | 1/2003 | Hemsath |
| 2003/0033523 A1 | 2/2003 | McNulty et al. |
| 2003/0041263 A1* | 2/2003 | Devine et al. ................. 713/201 |
| 2003/0149880 A1 | 8/2003 | Shamsaasef et al. |
| 2003/0172290 A1 | 9/2003 | Newcombe et al. |
| 2004/0006710 A1 | 1/2004 | Pollutro et al. |
| 2004/0187036 A1 | 9/2004 | Nakamura |
| 2005/0193137 A1 | 9/2005 | Farnham |
| 2006/0070114 A1* | 3/2006 | Wood et al. ....................... 726/2 |

(Continued)

FOREIGN PATENT DOCUMENTS

EP    0856974    8/1998

OTHER PUBLICATIONS

Office Action (Mail Date Feb. 28, 2011) for U.S. Appl. No. 12/049,483, filed Mar. 17, 2008; First Named Inventor: Alexander Brantley Sheehan; Confirmation No. 6957.

(Continued)

*Primary Examiner* — Joseph Greene
(74) *Attorney, Agent, or Firm* — Schmeiser, Olsen & Watts; John R. Pivnichny

(57) ABSTRACT

A selectable security method and system. The method includes retrieving first configuration data associated with a non interactive entity (NIE) software application and second configuration data associated with a plurality of requesters. A master refresh period is calculated from the first configuration data and the second configuration data. Credentials data associated with the NIE software application are retrieved. The credentials data are transmitted to a resource server. A session key generated by the resource server is received by the NIE software application. The NIE software application calculates a stale time associated with the session key. The NIE software application stores the session key and the stale time.

18 Claims, 8 Drawing Sheets

(56) References Cited

U.S. PATENT DOCUMENTS

| | | |
|---|---|---|
| 2006/0212706 A1 | 9/2006 | Jiang et al. |
| 2007/0124342 A1 | 5/2007 | Yamamoto et al. |
| 2007/0203983 A1 | 8/2007 | Fukuhara et al. |
| 2007/0214497 A1 | 9/2007 | Montgomery et al. |
| 2007/0248232 A1 | 10/2007 | Driscoll et al. |
| 2007/0277235 A1 | 11/2007 | Barrett et al. |
| 2008/0196101 A1 | 8/2008 | Sade et al. |
| 2008/0209068 A1 | 8/2008 | Herzog et al. |
| 2009/0222665 A1 | 9/2009 | Sheehan |
| 2009/0235338 A1* | 9/2009 | Sheehan ............ 726/5 |
| 2009/0235343 A1 | 9/2009 | Sheehan |

OTHER PUBLICATIONS

U.S. Appl. No. 12/039,839, filed Feb. 29, 2008; First Named Inventor: Alexander Brantley Sheehan; Confirmation No. 8281.

U.S. Appl. No. 12/045,735, filed Mar. 11, 2008; First Named Inventor: Alexander Brantley Sheehan; Confirmation No. 9834.

Office Action (Mail Date Apr. 11, 2011) for U.S. Appl. No. 12/045,735, filed Mar. 11, 2008; First Named Inventor: Alexander Brantley Sheehan; Confirmation No. 9834.

Notice of Allowance and Fee(s) Due (Mail Date Jun. 16, 2011) for U.S. Appl. No. 12/049,483, filed Mar. 17, 2008; First Named Inventor: Alexander Brantley Sheehan; Confirmation No. 6957.

Office Action (Mail Date Aug. 4, 2011) for U.S. Appl. No. 12/039,839, filed Feb. 29, 2008; Confirmation No. 8281.

Office Action (Mail Date Aug. 23, 2011) for U.S. Appl. No. 12/045,735, filed Mar. 11, 2008; Confirmation No. 9834.

Final Office Action (Mail Date Nov. 8, 2011) for U.S. Appl. No. 12/039,839, filed Feb. 29, 2008; Confirmation No. 8281.

Notice of Allowance (Mail Date Jan. 6, 2012) for U.S. Appl. No. 12/045,735, filed Mar. 11, 2008; Confirmation No. 9834.

Yuan, et al, Visualization Tools for Teaching Computer Security, Jan. 2010, Transactions on Computing Education (TOCE), vol. 9 Issue 4, Publisher: ACM, pp. 1-28.

Webster's Online Dictionary, "Definition: interactivity." http://www.websters-dictionary-online.org/definitions/interactivity.

Amendment and Request for Continued Examination filed Feb. 2, 2012 in response to Final Office Action (Mail Date Nov. 8, 2011) for U.S. Appl. No. 12/039,839, filed Feb. 29, 2008; Confirmation No. 8281.

Amendment filed Sep. 26, 2011 filed in response to Office Action (Mail Date Aug. 4, 2011) for U.S. Appl. No. 12/039,839, filed Feb. 29, 2008; Confirmation No. 8281.

Office Action (Mail Date Dec. 2, 2013) for U.S. Appl. No. 12/039,839, filed Feb. 29, 2008; Confirmation No. 8281.

Amendment filed Feb. 28, 2014 in response to Office Action (Mail Date Dec. 2, 2013) for U.S. Appl. No. 12/039,839, filed Feb. 29, 2008; Confirmation No. 8281.

Notice of Allowance (Mail Date Mar. 31, 2014) for U.S. Appl. No. 12/039,839, filed Feb. 29, 2008; Confirmation No. 8281.

* cited by examiner

SELECTABLE NON-INTERACTIVE ENTITY APPLICATION PROXY METHOD AND SYSTEM

FIELD OF THE INVENTION

The present invention relates to a method and associated system for maintaining a secure connection to a non-interactive entity software application which is used to proxy requests for resources from different requesters based on credentials associated with the requesters or credentials associated with the non-interactive entity software application.

BACKGROUND OF THE INVENTION

Maintaining secure connections between systems typically comprises an inefficient process with little flexibility. Accordingly, there exists a need in the art to overcome at least some of the deficiencies and limitations described herein above.

SUMMARY OF THE INVENTION

The present invention provides a selectable security method comprising:
initializing, by a computing system comprising a non interactive entity (NIE) software application, said NIE software application, wherein said NIE software application comprises an internal session cache;
transmitting, by said NIE software application to an administrator of said computing system, a notification message indicating said initializing;
retrieving, by said NIE software application, first configuration data associated with said NIE software application, wherein said first configuration data comprises a single refresh count associated with first session key requests, a single session refresh period associated with said first session key requests, and a single session ID associated with said NIE software application;
retrieving, by said NIE software application, second configuration data associated with a plurality of requesters, wherein said second configuration data comprises refresh counts associated with second session key requests, session refresh periods associated with said second session key requests, and session IDs associated with said plurality of requesters;
calculating, by said NIE software application, a first master refresh period from said session refresh periods and said single session refresh period;
retrieving, by said NIE software application, first credentials data associated with said NIE software application;
transmitting, by said NIE software application, said first credentials data to a resource server;
receiving, by said NIE software application from said resource server, a first session key associated with said resource server;
calculating, by said NIE software application, a first specified stale time associated with said first session key, wherein said calculating said first specified stale time comprises adding said single session refresh period to a first current time;
generating, by said NIE software application from said single refresh count, a first updated refresh count; and
storing within said internal session cache, by said NIE software application, said single session ID, said first session key, said first updated refresh count, said single session refresh period, and said first specified stale time.

The present invention provides a computing system comprising a processor coupled to a computer-readable memory unit, said memory unit comprising a non interactive entity (NIE) software application and instructions that when executed by the processor implements a selectable security method, said method comprising:
initializing, by said computing system, said NIE software application, wherein said NIE software application comprises an internal session cache;
transmitting, by said NIE software application to an administrator of said computing system, a notification message indicating said initializing;
retrieving, by said NIE software application, first configuration data associated with said NIE software application, wherein said first configuration data comprises a single refresh count associated with first session key requests, a single session refresh period associated with said first session key requests, and a single session ID associated with said NIE software application;
retrieving, by said NIE software application, second configuration data associated with a plurality of requesters, wherein said second configuration data comprises refresh counts associated with second session key requests, session refresh periods associated with said second session key requests, and session IDs associated with said plurality of requesters;
calculating, by said NIE software application, a first master refresh period from said session refresh periods and said single session refresh period;
retrieving, by said NIE software application, first credentials data associated with said NIE software application;
transmitting, by said NIE software application, said first credentials data to a resource server;
receiving, by said NIE software application from said resource server, a first session key associated with said resource server;
calculating, by said NIE software application, a first specified stale time associated with said first session key, wherein said calculating said first specified stale time comprises adding said single session refresh period to a first current time;
generating, by said NIE software application from said single refresh count, a first updated refresh count; and
storing within said internal session cache, by said NIE software application, said single session ID, said first session key, said first updated refresh count, said single session refresh period, and said first specified stale time.

The present invention advantageously provides a simple method and associated system capable of maintaining secure connections between systems.

DETAILED DESCRIPTION OF THE INVENTION

Figure 1:
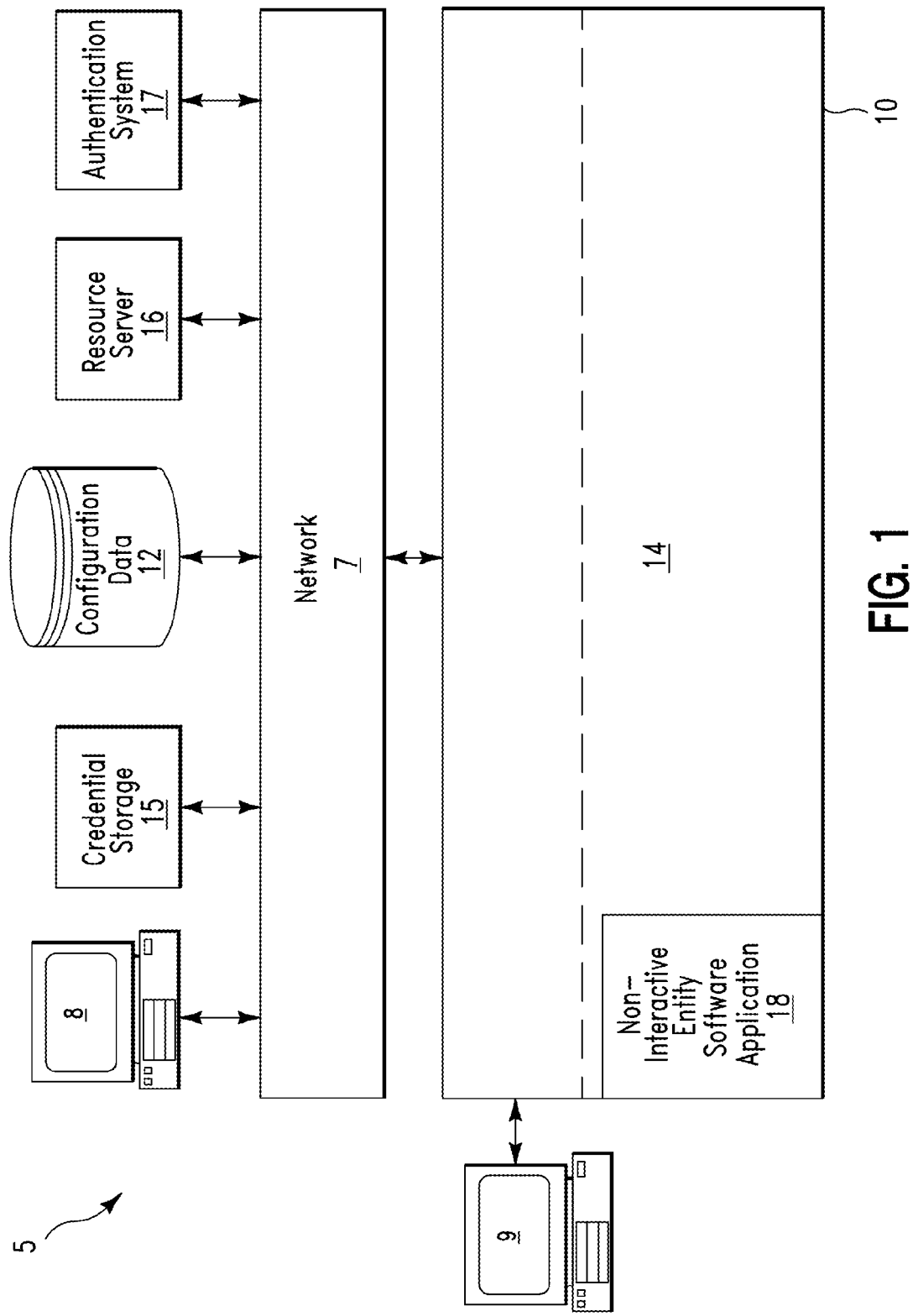
FIG. 1 illustrates a system for providing a secure means to initialize and maintain a secure connection to and from a non-interactive entity software application through which requests for resources may be serviced, in accordance with embodiments of the present invention.

FIG. 1 illustrates a system 5 for providing a secure means to initialize and maintain a secure connection to and from a non-interactive entity software application 18 through which requests for resources (i.e., from several requestors or non interactive entity software application 18 for a requester) may be serviced, in accordance with embodiments of the present invention. System 5 of FIG. 1 comprises a computing apparatus 8, a (secure) credential storage device 15, a configuration data store 12, a resource server 16 (e.g., a session-key-secured computing resource server), and an authentication system 17 connected to a computing system 10 through a network 7. Credential storage device 15 may comprise a single storage device or a plurality of storage devices. Configuration data store 12 may comprise a single data store or a plurality of data stores. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14 (e.g., an application server). Memory system 14 may comprise a single memory system (e.g., a single application server). Alternatively, memory system 14 may comprise a plurality of memory systems (e.g., multiple application servers). Memory system 14 comprises non-interactive entity software application 18. Computing apparatus 8 may comprise, inter alia, a personal computer, a laptop computer, a computer terminal, etc. Computing apparatus 8 may comprise a single computing apparatus or a plurality of computing apparatuses. Computing apparatus 8 is used by requesters (i.e., entities that request resources) in order to request a resource(s) (e.g., an application menu item) from resource server 16. Requestors may comprise people, software applications, or portions of software applications. System 5 may comprise an optional access terminal 9 connected to computing system 10. Optional access terminal 9 may be used to access non-interactive entity software application 18. Non-interactive entity software application 18 comprises application software that acts as a proxy between requestors and resource server 16. Non-interactive entity software application 18 manages an internal session cache (e.g., internal session cache 18b in FIG. 4), forwards requests to resource server 16, and returns results (i.e., resources) to the requester.

System 5 retrieves credentials (e.g., a user ID and password) for requestors (i.e., looking to request resources) from credential storage device 15 and submits the credentials to resource server 16 which returns a session key as a result of a successful authentication attempt with authentication system 17. Alternatively or additionally, system 2 may retrieve credentials (e.g., a user ID and password) for non-interactive entity software application 18 from credential storage device 15 and submit the credentials to resource server 16 which returns a session key as a result of a successful authentication attempt with authentication system 17. A session key is defined herein as a string of characters that acts as a ticket to access resources in resource server 16. Non-interactive entity software application 18 stores the session key along with a time stamp indicating a valid remaining lifetime for the issued session key. Additionally, non-interactive entity software application 18 stores the credentials and configuration data (i.e., retrieved from configuration data store 12) for the issued session key. Configuration data may comprise a refresh count, a refresh period, a session ID (i.e., for identifying non-interactive entity software application 18 and/or requesters), and a stale time. A refresh count is defined herein as a sequential, numerical value that indicates a number of times that a session key may be refreshed by the computing resource server's authentication process (i.e., authentication system 17) before the credentials must be read again from the secure storage location. A refresh period is defined herein as a time period that non-interactive entity software application 18 uses to calculate how frequently data in a session cache (i.e., internal to non-interactive entity software application 18) should be checked to determine if a session refresh attempt should occur. A stale time is defined herein as a date/time at which a validity of a current session key will expire.

The following process steps illustrate a session key transfer process performed by system 5:
1. Non-interactive entity software application 18 retrieves configuration data (i.e., for requestors and Non-interactive entity software application 18) from (secure) credential storage device 15.
2. Non-interactive entity software application 18 retrieves credentials (i.e., for requestors and Non-interactive entity software application 18) from (secure) credential storage device 15.
2. Non-interactive entity software application 18 sends the credentials to resource server 16, which has a pre-established trust relationship with authentication system 17.
3. Resource server creates, stores, and manages session keys in response to a successful authentication by non-interactive entity software application 18. Each session key may comprise an associated life span, which may be returned by authentication system 17 or stored locally for non-interactive entity software application 18 by another administrative process.
4. An identifier, session key, and data representing the session key's life time are stored in an internal (i.e., to non-interactive entity software application 18) session cache (i.e., session cache 18b in FIG. 4).
5. An iterative process will run repeatedly against the session cache in order to keep the stored session keys currently valid with resource server 16 and authentication system 17. Each refresh count in the session cache will indicate how many times an associated session key may be obtained by malting a light weight call (i.e., a simple request that may be quickly processed) to resource server 16, which will return fresh, new session keys. The aforementioned session key refresh process requires that either the requestors credentials or non-interactive entity software application 18 credentials be transmitted. Each fresh, new session key is obtained by passing a valid (almost expired) session key to resource server 16. The iterative process of refreshing the session keys will continue until a pre-configured refresh count has been reached.
6. When a requestor submits a resource request, non-interactive entity software application 18 queries the session cache for a matching requester Id or non-interactive entity software application 18 ID. If a matching Id is found, the valid associated session key is immediately returned. If a requestor Id is not found in the session cache, then non-interactive entity software application 18 must perform the authentication on behalf of the requestor. Note that only requests coming from requesters that have a pre established trust relationship with non-interactive entity Software application 18 will be serviced. Additionally, non-interactive entity software application 18 may request the resource on behalf of the requestor with the fresh session key. Since the resource request was made with a valid session key, resource server 16 performs a resource retrieval process and returns the requested resource to the non-interactive entity software application 18, which returns the requested resource to the requestor.

Figure 2:
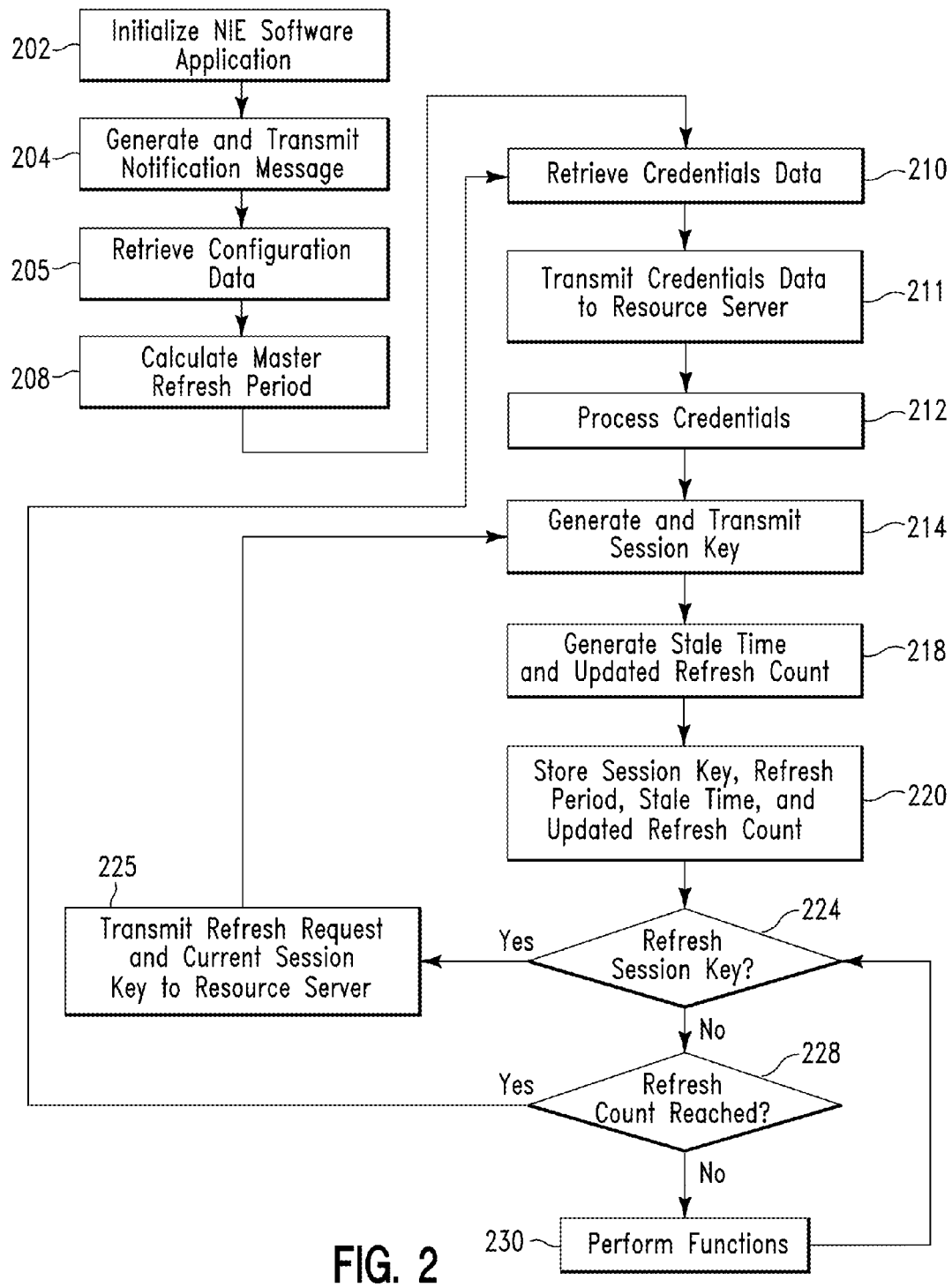
FIG. 2 illustrates a flowchart describing an algorithm used by the system of FIG. 1 for generating and refreshing a session key for requesters, in accordance with embodiments of the present invention.

FIG. 2 illustrates a flowchart describing an algorithm used by system 5 of FIG. 1 for generating and refreshing session keys for requesters and/or non-interactive entity software application 18, in accordance with embodiments of the present invention. In step 202, non-interactive entity software application 18 (i.e., from FIG. 1) is initialized. In step 203, a notification message is generated. The notification message indicates that non-interactive entity software application 18 has been initialized. The notification message is transmitted to an appropriate entity (e.g., an administrator). In step 204, non-interactive entity software application 18 retrieves configuration data from a storage location (e.g., data store 12 in FIG. 1). The configuration data may include a refresh count and a session refresh period associated with session key requests and a session ID for a requestor(s). Additionally, the configuration data may include a refresh count and a session refresh period associated with session key requests and a session ID for non-interactive entity software application 18. In step 208, non-interactive entity software application 18 calculates a master refresh period from all of the session refresh periods retrieved from the configuration data. The master refresh period may be calculated by scanning all of the session refresh periods, selecting a session refresh period (i.e., from the scanned refresh periods) with a smallest value, and subtracting a very small time period (e.g., a millisecond) from the selected refresh period. In step 210, non-interactive entity software application 18 retrieves credentials data (i.e., associated with a requestor and/or non-interactive entity software application 18) from a secure credential storage device (e.g., credential storage 15 in FIG. 1). Credentials data may comprise a user ID and password for the requestor and/or non-interactive entity software application 18. In step 211, non-interactive entity software application 18 transmits the credentials data to a resource server (e.g., resource server 16 in FIG. 1). In step 212, the credentials data is processed in order to authenticate the requester and/or non-interactive entity software application 18. The processing performed in step 212 may comprise the following steps:
1. The resource server transmits the credentials data to an authentication system (e.g., authentication system 17 in FIG. 1) in order to generate an authentication attempt.
2. The authentication system returns a result associated with the authentication attempt. If authentication attempt is successful, a value indicating "success" is returned to the resource server.

In step 214 (i.e., upon a successful authentication), the resource server generates a session key, which has its lifetime encoded in the session key "ticket". The resource server transmits the session key to non-interactive entity software application 18. In step 218, non-interactive entity software application 18 generates a stale time and updated refresh count associated with the session key. The stale time is calculated by adding the master refresh period (i.e., from step 208) to a current time. In step 220, the session key, the updated refresh count, the stale time, and the session ID are stored within an internal session cache within non-interactive entity software application 18. In step 224, it is periodically determined if the session key should be refreshed. If in step 224, it is determined that the session key should be refreshed then in step 225, a refresh request and the current session key is transmitted to the resource server and step 214 is executed. If in step 224, it is determined that the session key should not be refreshed then in step 228 it is determined if the refresh count has been reached. If in step 228 it is determined that the refresh count has been reached then step 210 is executed. If in step 228 it is determined that the refresh count has not been reached then in step 230 non-interactive entity software application 18 performs intended functions and periodically executes step 224. The above described process steps (i.e., steps 210 . . . 230) illustrated in the algorithm of FIG. 2 are repeated for: different requesters and that submit requests for resources and/or non-interactive entity software application 18.

Figure 3:
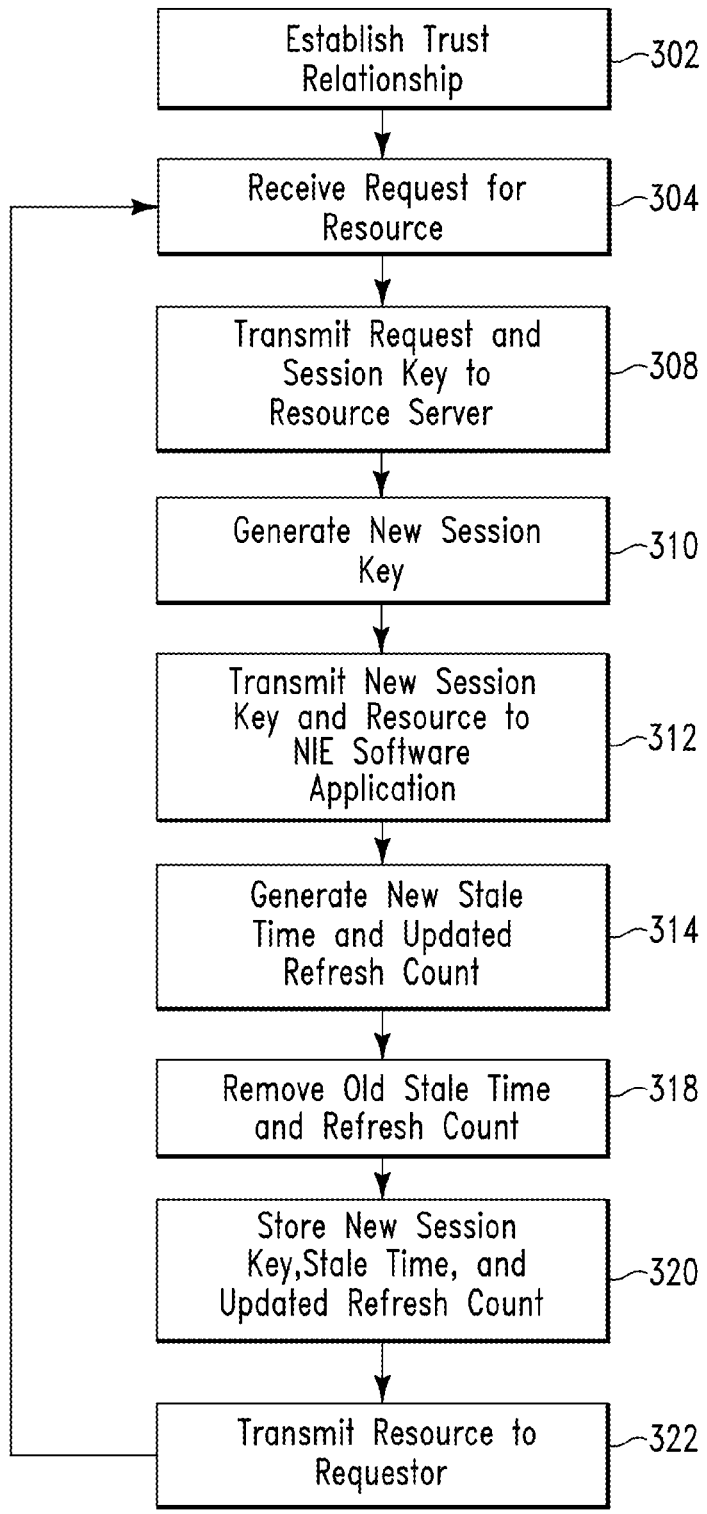
FIG. 3 illustrates a flowchart describing an algorithm used by the system of FIG. 1 for executing a resource request, in accordance with embodiments of the present invention.

FIG. 3 illustrates a flowchart describing an algorithm used by system 5 of FIG. 1 for executing a resource request, in accordance with embodiments of the present invention. In step 302, a trust relationship (e.g., the configuration of mutual SSL between a client and a server using X.509 certificates) between a requestor and non-interactive entity software application 18 (i.e., from FIG. 1) is established. In step 304, non-interactive entity software application 18 receives (from a requestor) a request for a resource. In step 308, non-interactive entity software application 18 transmits a current session key (i.e., generated in step 214 of FIG. 2) and the request to a resource server. In step 310, the resource server generates a new session key. In step 312, the resource server transmits the new session key and the requested resource to non-interactive entity software application 18. In step 314, a new stale time and updated refresh count is generated. In step 318, a previous stale time and refresh count are removed from an internal session cache within non-interactive entity software application 18. In step 320, the new session key, the new stale time, and the updated refresh count are each stored in the internal session cache within non-interactive entity software application 18. In step 322, the requested resource is transmitted to the requester and step 304 is repeated (i.e., for a same requestor or a different requester).

Figure 4A:
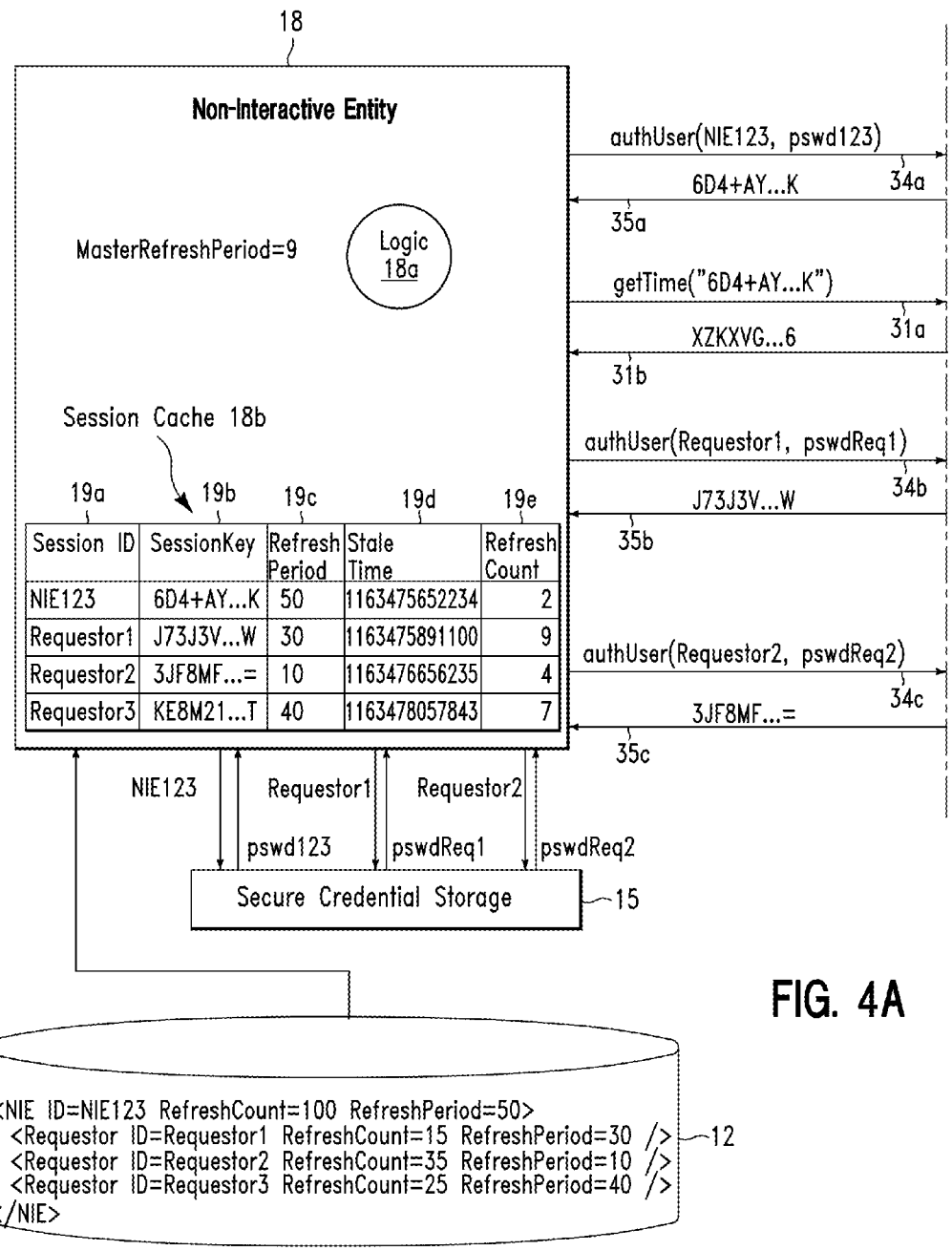
FIGS. 4A and 4B illustrates a component diagram describing a usage process for implementing the algorithm of FIG. 2, in accordance with embodiments of the present invention.
Figure 4B:
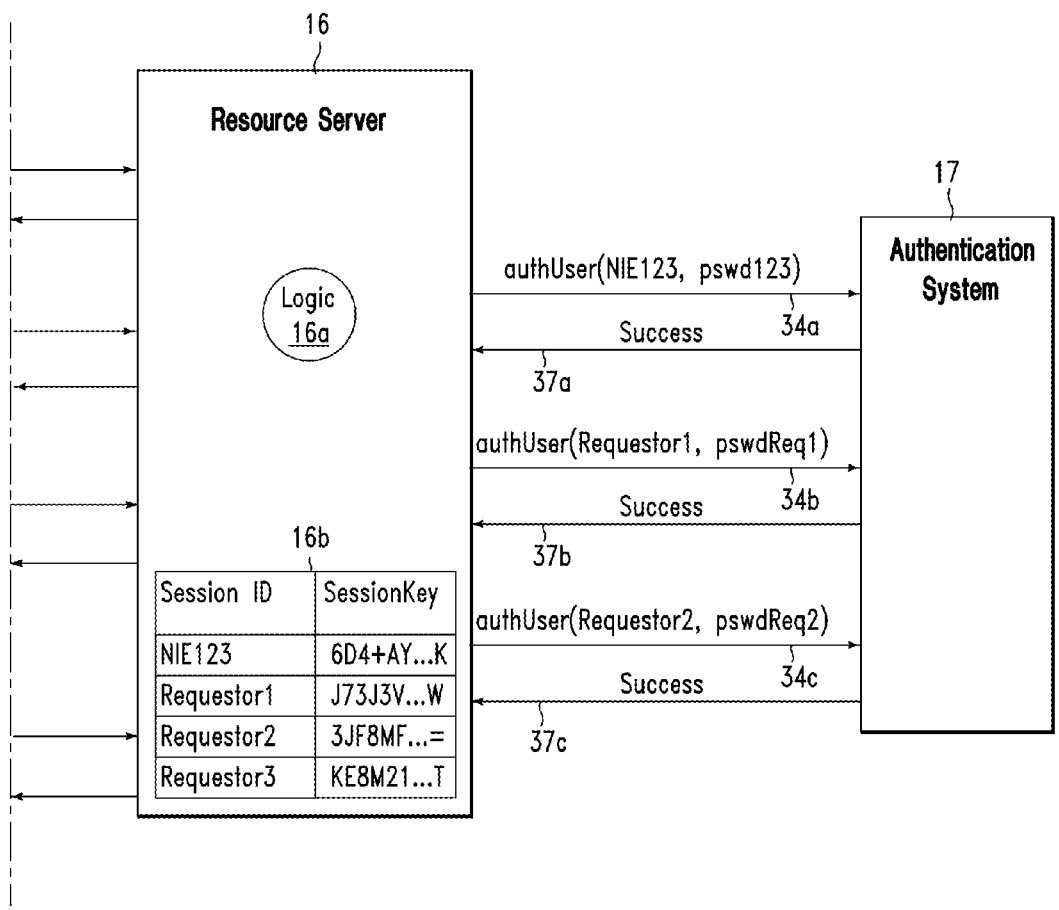
Figure 4:
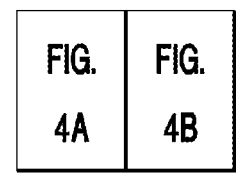
FIG. 4 which includes

FIG. 4 which includes FIGS. 4A and 4B illustrates a component diagram describing a usage process for implementing the algorithm of FIG. 2 for generating and refreshing session keys for multiple requesters and/or non interactive entity software application 18, in accordance with embodiments of the present invention. The usage process illustrates an initialization process for system 5 of FIG. 1 (i.e., a process executed to setup and maintain a session cache of fresh session keys that may be used to improve the performance of a resource request handling process). Non interactive entity software application 18 is a software program that maintains a secure connection with resource server 16 and acts as a proxy for servicing requests for resources from requesters. Session cache 18b is an internal data storage mechanism used by non interactive entity software application 18 to store session related data which includes a Session Id 19a (i.e., identifies the entity and/or non interactive entity software application 18 making the request for resources), a session key 19b (i.e., a string of characters that acts as a ticket to access resources of resource server 16) for each requestor, a refresh period 19c for each requester, a stale time 19d (i.e., a date/time at which a validity of the session key 19b will expire) for each requester, and a refresh count 19e (a number of iterations in which the non interactive entity software application 18 will continue to make light-weight calls to resource server 16 in order to refresh a session key 19b for this session) for each requestor. Non interactive entity software application 18 comprises internal logic 18a for performing processing. Logic 18a is used to keep session keys alive/valid so that subsequent resource requests may be immediately serviced without a need to authenticate each and every request from requestor. Configuration data store 12 comprises a storage mechanism for configuration data. Configuration data may include a session id, a refresh count (non interactive entity software application 18 takes this value and for an initial session cache record insertion) and a refresh period (a time, e.g., a number of seconds between non interactive entity software application 18 scans of the session cache in which the non interactive entity software application 18 may refresh the session key(s)). Note that at the time that the configuration data is loaded, Logic 18a locates a refresh period 19c comprising a lowest value, subtracts a very small amount from the lowest value (e.g., a millisecond), and stores the difference in a master refresh record variable. The master refresh record variable is used to determine how often logic 18a will read through session cache 18b data looking for a stale time 19d that has been reached. If a value for stale time 19d is equal to or older than a current time, then a light weight call will be made to resource server 16 in order to retrieve a fresh new session key 19b (i.e., to refresh this session). Secure credential storage comprises a storage device for storing the credentials associated with requesters and non interactive entity software application 18. Non interactive entity software application 18 transmits a requestor ID and follows requisite secure credential storage protocol and in return retrieves a requester password.

The following process steps illustrate a process for generating and refreshing a session key:

1. Resource server 16 accepts requests for resources and services the requests after resource server 16 authenticates non interactive entity software application 18 using it's credentials or validates that a session key (e.g., session key 19b) passed to resource server 16 (i.e., from a requestor) is valid. Additionally, resource server 16 generates the session key and stores the session key with its associated Session Id for subsequent request processing.
2. Logic 16a performs an authentication of requesters or non interactive entity software application 18, creates session keys, stores the session Id and it's associated session key, and determines a validity of the session key values passed to it by non interactive entity software application 18 when the non interactive entity software application 18 requests resources on behalf of a requester.
3. Internal storage mechanism 16b of resource server 16 comprises a storage location for storing a session key with its associated session Id for each requestor and non interactive entity software application 18.
4. Authentication system 17 services user (requestor or non interactive entity software application 18) authentication requests for the resource server. For example, authentication system 17 may allow resource server 16 to send a user Id and password which it will then check for validity.
5. Non interactive entity software application 18 transmits an authentication request 34a for non interactive entity software application 18 to resource server 16. Authentication request 34a is performed at initial startup or when the refresh count has been reached.
6. Non interactive entity software application 18 transmits an authentication request 34b for requestor 1 to resource server 16. Authentication request 34b is performed at initial startup or when the refresh count has been reached.
7. Non interactive entity software application 18 transmits an authentication request 34c for requester 2 to resource server 16. Authentication request 34c is performed at initial startup or when the refresh count has been reached.
8. A session key 35a (e.g., 6D4+AY . . . K) is returned by resource server 16 to non interactive entity software application 18 for non interactive entity software application 18.
9. A session key 35b (e.g., J7373V . . . W) is returned by resource server 16 to non interactive entity software application 18 for requestor 1.
10. A session key 35c (e.g., 3JF8MF . . . =) is returned by resource server 16 to non interactive entity software application 18 for requester 2.
11. Each time logic 18a scans session cache 18b and locates a stale time 19d that is greater than a current time, a session key 19b refresh attempt is performed thereby decrementing refresh count 19e by one for that session. At this time, non interactive entity software application 18 makes a lightweight request 31a of resource server 16 (e.g., getTime ("6D4+AY . . . K"), in which it passes a currently valid session key 19b.
12. Resource server 16 generates a new session key 31b whose lifetime has been reset to a time determined by resource server 16. Note that the reset lifetime should be greater than a stale time (e.g., stale time 19d) stored in the record for this session key in session cache 18b.
13. Resource server 16 transmits authentication request 34a to authentication system 17 to authenticate non interactive entity software application 18.
14. Resource server 16 transmits authentication request 34b to authentication system 17 to authenticate requestor 1.
15. Resource server 16 transmits authentication request 34c to authentication system 17 to authenticate requestor 2.
16. Authentication system 17 returns a value of success 37a (e.g., true/yes/1) if the authentication process validates the passed credentials for non interactive entity software application 18.
17. Authentication system 17 returns a value of success 37b (e.g., true/yes/1) if the authentication process validates the passed credentials for requester 1.
18. Authentication system 17 returns a value of success 37c (e.g., true/yes/1) if the authentication process validates the passed credentials for requestor 2.

Figure 5A:
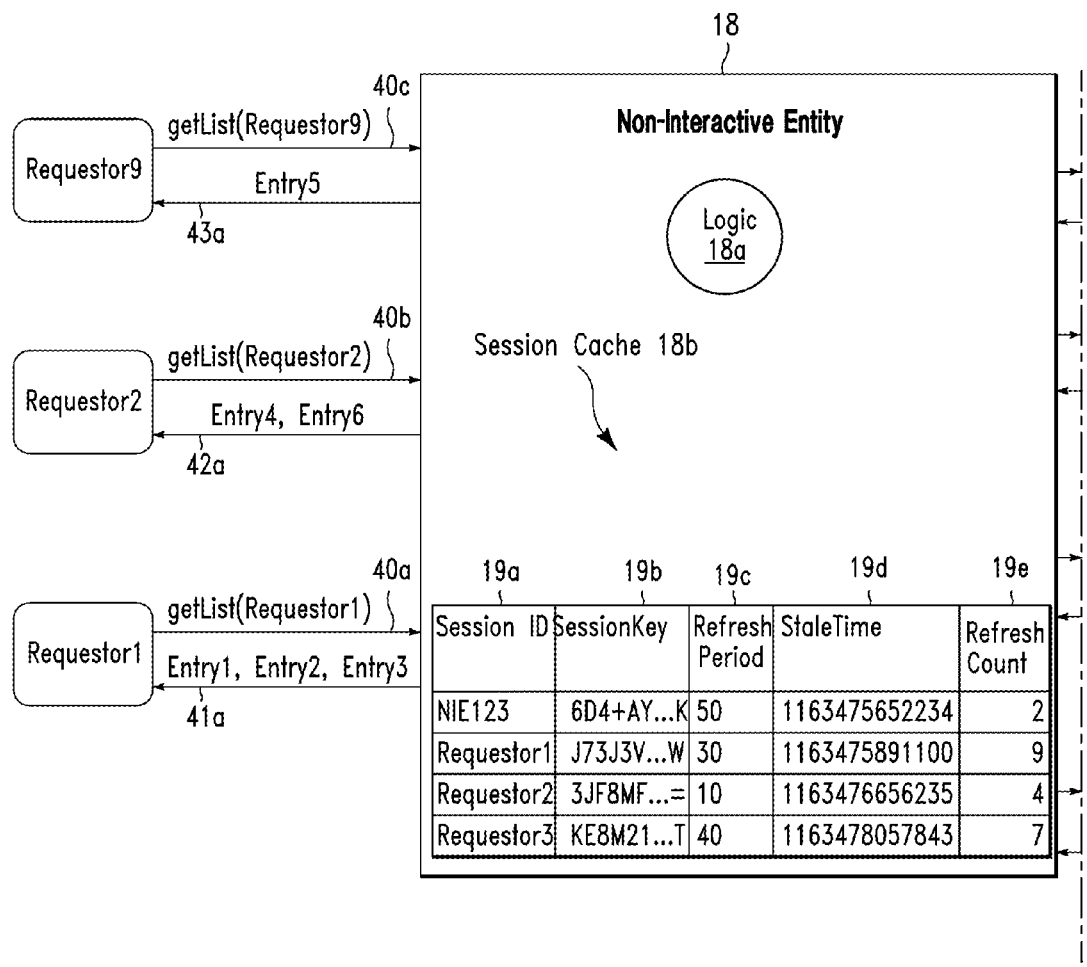
FIGS. 5A and 5B illustrates a component diagram describing a usage process for implementing the algorithm of FIG. 3, in accordance with embodiments of the present invention.
Figure 5:
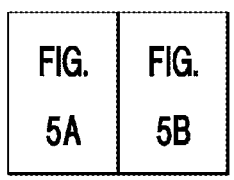
FIG. 5 which includes
Figure 5B:
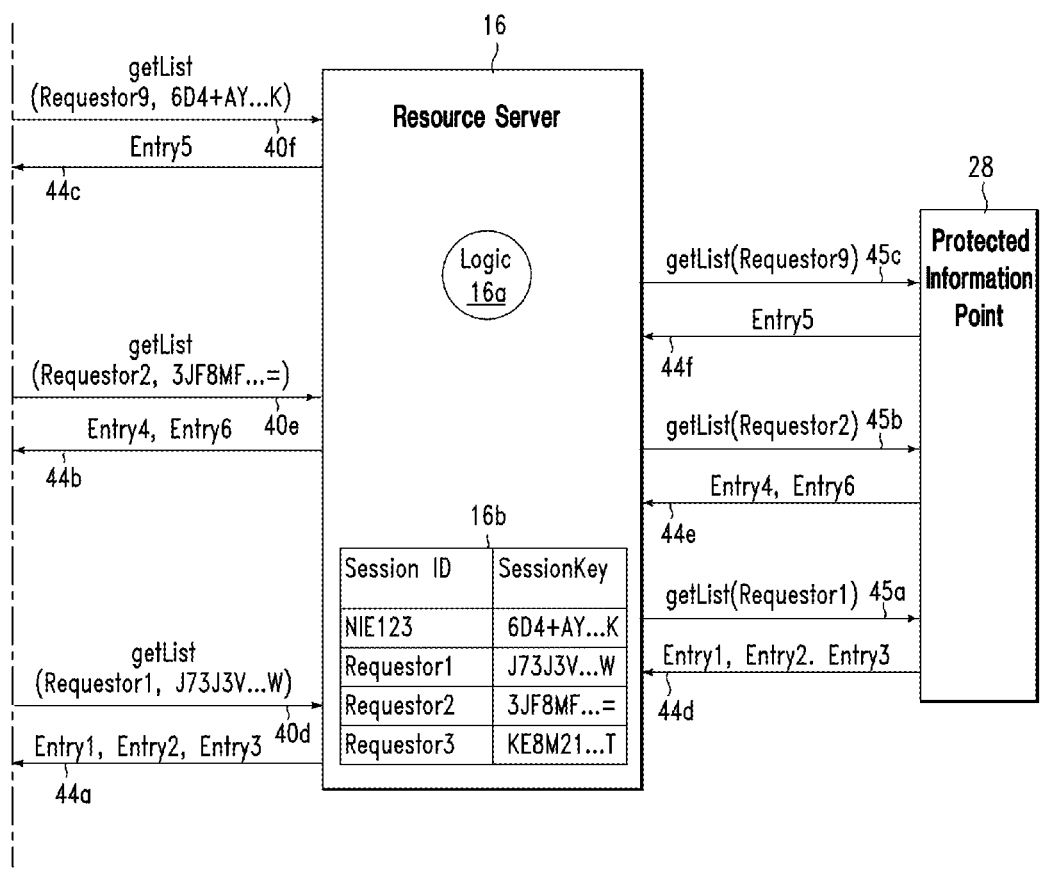

FIG. 5 which includes FIGS. 5A and 5B illustrates a component diagram describing a usage process for implementing the algorithm of FIG. 3 for handling requests for resources for multiple requesters or non interactive entity software application 18, in accordance with embodiments of the present invention. The requests for resources are generated by requesters. Non interactive entity software application 18 and resource sever 16 in FIG. 5 have been described with reference to FIG. 4, supra. A protected information point 28 comprises requested resources.

The following process steps illustrate a process for handling requests for resources (i.e., after session cache 18b has been filled with fresh session keys):

1. A request for resources 40a is transmitted by requestor 1 to non interactive entity software application 18. For example, request for resources 40a in FIG. 5 comprises getList (Requestor1). Note that a trust relationship has been established between requester 1 and non interactive entity software application 18 prior to requester 1 generating request for resources 40a.
2. A request for resources 40b is transmitted by requester 2 to non interactive entity software application 18. For example, request for resources 40b in FIG. 5 comprises getList (Requestor2). Note that a trust relationship has been established between requester 2 and non interactive entity software application 18 prior to requester 1 generating request for resources 40b.

3. A request for resources 40c is transmitted by requester 9 to non interactive entity software application 18. For example, request for resources 40c in FIG. 5 comprises getList (Requestor9). Note that a trust relationship has been established between requestor 9 and non interactive entity software application 18 prior to requester 9 generating request for resources 40c.

4. Results 41a (e.g., Entry1, Entry2, Entry3) to request for resources 40a are returned by non interactive entity software application 18 to requester 1 as a result of processing the request.

5. Results 42a (e.g., Entry4, Entry6) to request for resources 40b are returned by non interactive entity software application 18 to requester 2 as a result of processing the request.

6. Results 43a (e.g., Entry5) to request for resources 40c are returned by non interactive entity software application 18 to requester 9 as a result of processing the request.

7. A request for resources 40d is transmitted from non interactive entity software application 18 to resource server 16 on behalf of requester 1. Note that request for resources 40d comprises session key (J73J3V . . . W) associated with requester 1 as well as request for resources 40a. Resource server 16 validates session key (J73J3V . . . W) and processes request for resources 40d if session key (J73J3V . . . W) is valid.

8. A request for resources 40e is transmitted from non interactive entity software application 18 to resource server 16 on behalf of requestor 2. Note that request for resources 40e comprises session key (3JF8MF . . . =) associated with requestor 2 as well as request for resources 40b. Resource server 16 validates session key (3JF8MF . . . =) and processes request for resources 40e if session key (3JF8MF . . . =) is valid.

9. A request for resources 40f is transmitted from non interactive entity software application 18 to resource server 16 on behalf of requestor 9. Note that request for resources 40f comprises session key (6D4+AY . . . K) associated with non interactive entity software application 18 as well as request for resources 40c. Resource server 16 validates session key (6D4+AY . . . K) and processes request for resources 40f if session key (6D4+AY . . . K) is valid.

10. Results 44a are returned from resource server 16 to non interactive entity software application 18 as a result of processing request for resources 40d.

11. Results 44b are returned from resource server 16 to non interactive entity software application 18 as a result of processing request for resources 40e.

12. Results 44c are returned from resource server 16 to non interactive entity software application 18 as a result of processing request for resources 40f.

13. A request for resources 45a is transmitted from resource server 16 to protected information point 28.

14. A request for resources 45b is transmitted from resource server 16 to protected information point 28.

15. A request for resources 45c is transmitted from resource server 16 to protected information point 28.

16. Results 44d are returned from protected information point 28 to resource server 16 as a result of processing request for resources 45a.

17. Results 44e are returned from protected information point 28 to resource server 16 as a result of processing request for resources 45b.

18. Results 44f are returned from protected information point 28 to resource server 16 as a result of processing request for resources 45c.

Figure 6:
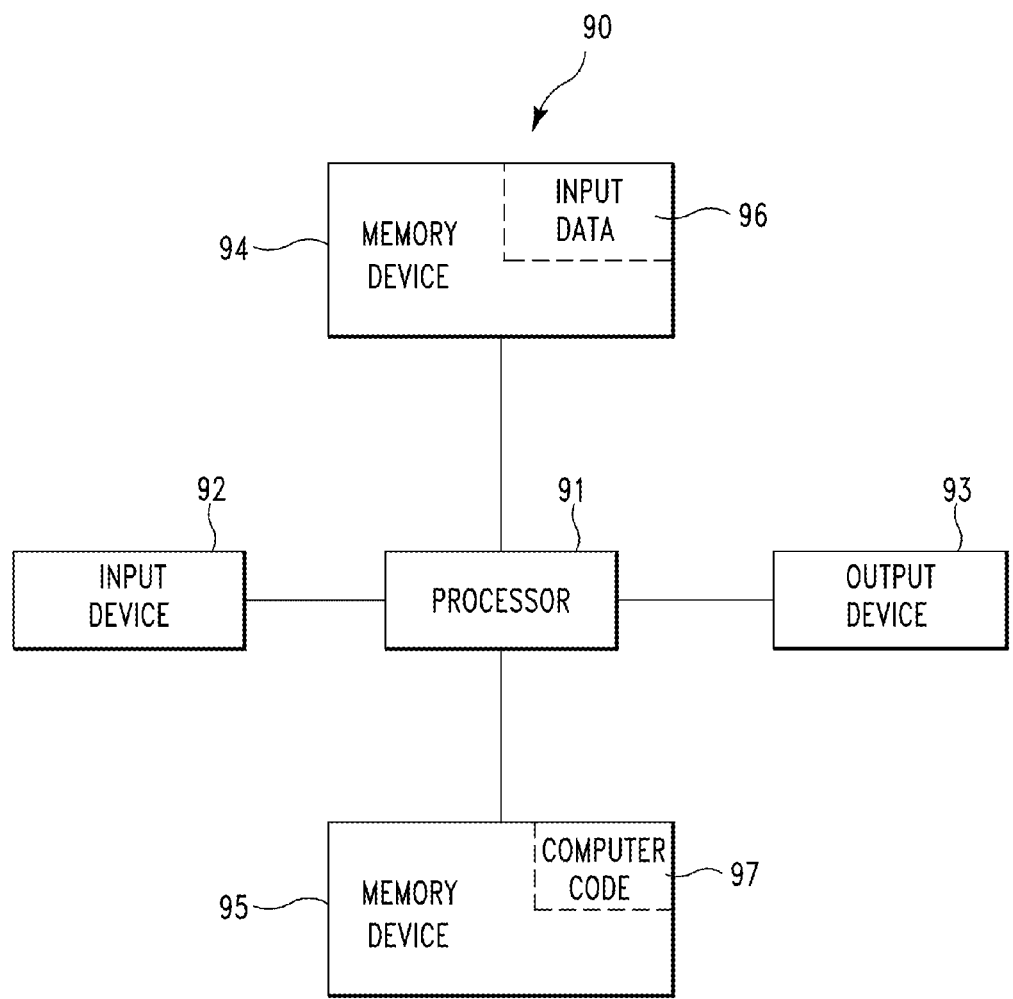
FIG. 6 illustrates a computer apparatus used for providing a secure means to initialize and maintain a secure connection to and from a non-interactive entity software application through which requests for resources may be serviced, in accordance with embodiments of the present invention.

FIG. 6 illustrates a computer apparatus 90 (e.g., computing system 10 of FIG. 1) used for providing a secure means to initialize and maintain a secure connection to and from a non-interactive entity software application through which requests for resources (i.e., from several requesters or non interactive entity software application 18 for a requester) may be serviced, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for providing a secure means to initialize and maintain a secure connection to and from a non-interactive entity software application through which requests for resources (i.e., from several requestors or non interactive entity software application 18 for a requester) may be serviced. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to provide a secure means to initialize and maintain a secure connection to and from a non-interactive entity software application through which requests for resources (i.e., from several requestors or non interactive entity software application 18 for a requestor) may be serviced. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for providing a secure means to initialize and maintain a secure connection to and from a non-interactive entity software application through which requests for resources (i.e., from several requesters or non interactive entity software application 18 for a requestor) may be serviced. In another embodiment, the invention provides a business method that performs the process steps of the invention on a subscription, advertising, and/or fee basis. That is, a service provider, such as a Solution Integrator, could offer to provide a secure means to initialize and maintain a secure connection to and from a non-interactive entity software application through which requests for resources (i.e., from several requestors or non interactive entity software application 18 for a requestor) may be serviced. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A selectable security method comprising:
   initializing, by a computing system comprising a computer processor and a non interactive entity (NIE) software application, said NIE software application, wherein said NIE software application comprises an internal session cache and internal logic configured to maintain a validity of session keys so that multiple subsequent resource requests may be immediately serviced without a need to authenticate all requests from a requestor, wherein said internal logic determines a validity of session key values passed to it by said NIE software application when said NIE software application requests resources on behalf of a requestor, and wherein the internal session cache comprises an internal data structure within said NIE software application;
   transmitting, by said NIE software application to an administrator of said computing system, a notification message indicating said initializing;
   retrieving, by said NIE software application, first configuration data associated with said NIE software application, wherein said first configuration data consists of a single refresh count associated with first session key requests, a single session refresh period associated with said first session key requests, and a single session ID associated with said NIE software application, and wherein said single refresh count comprises a number of iterations in which said NIE software application will continue to make light-weight calls to a resource server in order to refresh a session key for a current session for each requestor;
   retrieving, by said NIE software application, second configuration data associated with a plurality of requestors, wherein said second configuration data comprises refresh counts associated with second session key requests, session refresh periods associated with said second session key requests, and session IDs associated with said plurality of requestors;
   calculating, by said computer processor executing said NIE software application, a first master refresh period from said session refresh periods and said single session refresh period, wherein said calculating said first master refresh period comprises:
   scanning said session refresh periods;
   selecting a first session refresh period from said session refresh periods, said first session refresh period comprising a smallest value as compared to all other of said session refresh periods; and
   subtracting a specified time period from said first session refresh period;
   retrieving, by said NIE software application from an external secure credentials storage device, first credentials data associated with said NIE software application, wherein said first credentials data consists of a user ID and password for said NIE software application, and wherein said first credentials data is hardcoded within source code of said NIE software application;
   transmitting, by said NIE software application, said first credentials data to a resource server to generate an authentication attempt;
   receiving, by said NIE software application, a result value indicating a result of said authentication attempt;
   receiving, by said NIE software application from said resource server, a first session key as a result of said authentication attempt being successful, wherein said first session key comprises a string of characters for accessing resources in said resource server, and wherein said first session key comprises an encoded reset lifetime;
   receiving, by said NIE software application from said resource server, a first session key as a result of a successful authentication attempt, wherein said first session key comprises a string of characters for accessing resources in said resource server, and wherein said first session key comprises an encoded reset lifetime;
   repeatedly running, by said NIE software application, an iterative process with respect to the internal session cache in order currently validate all stored session keys with respect to said resource server and an authentication system, wherein each refresh count in the internal session cache indicates how many times an associated session key may be obtained by making a light weight call to said resource server, wherein resource server returns new session keys, wherein each key of said new session keys is obtained by passing a valid almost expired session key to said resource server, and wherein said iterative process continues until a pre-configured refresh count has been obtained;
   calculating, by said NIE software application, a first specified stale time associated with a date and time at which a validity of said first session key will expire, wherein said calculating said first specified stale time comprises adding said single session refresh period to a first current time, and wherein said encoded reset lifetime is greater than said first specified stale time;
   generating, by said NIE software application from said single refresh count, a first updated refresh count;
   storing within columns of said internal data structure of said internal session cache, by said NIE software application, said single session ID, said first session key, said first updated refresh count, said single session refresh period, and said first specified stale time;
   retrieving, by said NIE software application, second credentials data associated with a first requestor of said plurality of requestors;
   transmitting, by said NIE software application, said second credentials data to said resource server;

receiving, by said NIE software application from said resource server, a second session key associated with said resource server and said first requestor;

calculating, by said NIE software application, a second specified stale time associated with said second session key, wherein said calculating said second specified stale time comprises adding a first session refresh period of said session refresh periods to a second current time;

generating, by said NIE software application from a first refresh count of said refresh counts, a second updated refresh count;

removing from said internal session cache, by said NIE software application, said first specified stale time and said first updated refresh count; and storing within said internal session cache, by said NIE software application, a first session ID of said session IDs associated with said first requestor, said second session key, said first session refresh period, said second updated refresh count, and said second specified stale time.

2. The method of claim 1, further comprising:

retrieving, by said NIE software application, third credentials data associated with a second requestor of said plurality of requestors;

transmitting, by said NIE software application, said third credentials data to said resource server;

receiving, by said NIE software application from said resource server, a third session key associated with said resource server and said second requestor;

calculating, by said NIE software application, a third specified stale time associated with said third session key, wherein said calculating said third specified stale time comprises adding a second session refresh period of said session refresh periods to a third current time;

generating, by said NIE software application from a second refresh count of said refresh counts, a third updated refresh count; and storing within said internal session cache, by said NIE software application, a second session ID of said session IDs associated with said second requestor, said third session key, said second session refresh period, said third updated refresh count, and said third specified stale time.

3. The method of claim 2, further comprising:

detecting, by said NIE software application, that said first master refresh period has expired;

transmitting, by said NIE software application to said resource server, a first request for a new session key;

retrieving, by said NIE software application from said internal session cache, said third session key;

transmitting, by said NIE software application to said resource server, said third session key;

receiving, by said NIE software application from said resource server in response to said first request, a fourth session key associated with said resource server and said second requestor;

calculating, by said NIE software application, a fourth specified stale time associated with said fourth session key, wherein said calculating said fourth specified stale time comprises adding a third session refresh period of said session refresh periods to a fourth current time;

generating, by said NIE software application from a third refresh count of said refresh counts, a fourth updated refresh count;

removing, by said NIE software application from said internal session cache, said third updated refresh count, and said third specified stale time; and storing within said internal session cache, by said NIE software application, said fourth session key, said third updated refresh count, and said fourth specified stale time.

4. The method of claim 2, further comprising:

establishing, by said NIE software application, a first trust relationship between said NIE software application and said second requestor;

receiving, by said NIE software application from said second requestor, a first resource request for retrieving a first resource from said resource server;

retrieving, by said NIE software application from said internal session cache, said third session key;

transmitting, by said NIE software application to said resource server, said first resource request and said third session key;

receiving, by said NIE software application from said resource server in response to said first resource request, a fourth session key and a first resource;

calculating, by said NIE software application, a fourth specified stale time associated with said fourth session key, wherein said calculating said fourth specified stale time comprises adding a third session refresh period of said session refresh periods to a fourth current time;

generating, by said NIE software application from a third refresh count of said refresh counts, a fourth updated refresh count;

removing, by said NIE software application from said internal session cache, said third specified stale time and said third updated refresh count;

storing within said internal session cache, by said NIE software application, said fourth session key, said fourth updated refresh count, and said fourth specified stale time; and transmitting, by said NIE software application, said first resource to said second requester.

5. The method of claim 1, further comprising:

detecting, by said NIE software application, that said first master refresh period has expired;

transmitting, by said NIE software application to said resource server, a first request for a new session key;

retrieving, by said NIE software application from said internal session cache, said second session key;

transmitting, by said NIE software application to said resource server, said second session key;

receiving, by said NIE software application from said resource server in response to said first request, a third session key associated with said resource server and said first requestor;

calculating, by said NIE software application, a third specified stale time associated with said third session key, wherein said calculating said third specified stale time comprises adding a second session refresh period of said session refresh periods to a third current time;

generating, by said NIE software application from a second refresh count of said refresh counts, a third updated refresh count;

removing, by said NIE software application from said internal session cache, said second updated refresh count, and said second specified stale time; and storing within said internal session cache, by said NIE software application, said third session key, said third updated refresh count, and said third specified stale time.

6. The method of claim 1, further comprising: establishing, by said NIE software application, a first trust relationship between said NIE software application and said first requestor; receiving, by said NIE software application from said first requestor, a first resource request for retrieving a first resource from said resource server; retrieving, by said NIE software application from said internal session cache, said second session key; transmitting, by said NIE software application to said resource server, said first resource request and said second session key; receiving, by said NIE software application from said resource server in response to said first resource request, a third session key and a first resource; calculating, by said NIE software application, a third specified stale time associated with said third session key, wherein said calculating said third specified stale time comprises adding a second session refresh period of said session refresh periods to a third current time; generating, by said NIE software application from a second refresh count of said refresh counts, a third updated refresh count; removing, by said NIE software application from said internal session cache, said second specified stale time and said second updated refresh count; and storing within said internal session cache, by said NIE software application, said third session key, said third updated refresh count, and said third specified stale time; and transmitting, by said NIE software application, said first resource to said first requester.

7. The method of claim 1, further comprising:
establishing, by said NIE software application, a first trust relationship between said NIE software application and a first requestor, wherein said plurality of requestors does not comprise said first requestor;
receiving, by said NIE software application from said first requestor, a first resource request for retrieving a first resource from said resource server;
retrieving, by said NIE software application from said internal session cache, said first session key;
transmitting, by said NIE software application to said resource server, said first resource request and said first session key;
receiving, by said NIE software application from said resource server in response to said first resource request, a second session key and a first resource;
calculating, by said NIE software application, a second specified stale time associated with said second session key, wherein said calculating said second specified stale time comprises adding said single session refresh period to a second current time;
generating, by said NIE software application from said first updated refresh count, a second updated refresh count;
removing, by said NIE software application from said internal session cache, said first specified stale time and said first updated refresh count;
storing within said internal session cache, by said NIE software application, said second session key, said second updated refresh count, and said second specified stale time; and
transmitting, by said NIE software application, said first resource to said first requester.

8. The method of claim 1, further comprising:
detecting, by said NIE software application, that said first master refresh period has expired;
transmitting, by said NIE software application to said resource server, a first request for a new session key;
retrieving, by said NIE software application from said internal session cache, said first session key;
transmitting, by said NIE software application to said resource server, said first session key;
receiving, by said NIE software application from said resource server in response to said first request, a second session key associated with said resource server and said first requestor;
calculating, by said NIE software application, a second specified stale time associated with said second session key, wherein said calculating said second specified stale time comprises adding said single session refresh period to a second current time;
generating, by said NIE software application from said first updated refresh count, a second updated refresh count;
removing, by said NIE software application from said internal session cache, said first updated refresh count, and said first specified stale time; and
storing within said internal session cache, by said NIE software application, said second session key, said second updated refresh count, and said second specified stale time.

9. A computing system comprising a computer processor coupled to a computer-readable memory unit, said memory unit comprising a non interactive entity (NIE) software application and instructions that when executed by the processor implements a selectable security method, said method comprising:
initializing, by said computing system, said NIE software application, wherein said NIE software application comprises an internal session cache and internal logic configured to maintain a validity of session keys so that multiple subsequent resource requests may be immediately serviced without a need to authenticate all requests from a requestor, wherein said internal logic determines a validity of session key values passed to it by said NIE software application when said NIE software application requests resources on behalf of a requestor, and wherein the internal session cache comprises an internal data structure within said NIE software application;
transmitting, by said NIE software application to an administrator of said computing system, a notification message indicating said initializing;
retrieving, by said NIE software application, first configuration data associated with said NIE software application, wherein said first configuration data consists of a single refresh count associated with first session key requests, a single session refresh period associated with said first session key requests, and a single session ID associated with said NIE software application, and wherein said single refresh count comprises a number of iterations in which said NIE software application will continue to make light-weight calls to a resource server in order to refresh a session key for a current session for each requestor;
retrieving, by said NIE software application, second configuration data associated with a plurality of requestors, wherein said second configuration data comprises refresh counts associated with second session key requests, session refresh periods associated with said second session key requests, and session IDs associated with said plurality of requestors;
calculating, by said computer processor executing said NIE software application, a first master refresh period from said session refresh periods and said single session refresh period, wherein said calculating said first master refresh period comprises:
scanning said session refresh periods;
selecting a first session refresh period from said session refresh periods, said first session refresh period comprising a smallest value as compared to all other of said session refresh periods; and
subtracting a specified time period from said first session refresh period;

retrieving, by said NIE software application from an external secure credentials storage device, first credentials data associated with said NIE software application, wherein said first credentials data consists of a user ID and password for said NIE software application, and wherein said first credentials data is hardcoded within source code of said NIE software application;

transmitting, by said NIE software application, said first credentials data to a resource server to generate an authentication attempt;

receiving, by said NIE software application, a result value indicating a result of said authentication attempt;

receiving, by said NIE software application from said resource server, a first session key as a result of said authentication attempt being successful, wherein said first session key comprises a string of characters for accessing resources in said resource server, and wherein said first session key comprises an encoded reset lifetime;

repeatedly running, by said NIE software application, an iterative process with respect to the internal session cache in order currently validate all stored session keys with respect to said resource server and an authentication system, wherein each refresh count in the internal session cache indicates how many times an associated session key may be obtained by making a light weight call to said resource server, wherein resource server returns new session keys, wherein each key of said new session keys is obtained by passing a valid almost expired session key to said resource server, and wherein said iterative process continues until a pre-configured refresh count has been obtained;

calculating, by said NIE software application, a first specified stale time associated with a date and time at which a validity of said first session key will expire, wherein said calculating said first specified stale time comprises adding said single session refresh period to a first current time, and wherein said encoded reset lifetime is greater than said first specified stale time;

generating, by said NIE software application from said single refresh count, a first updated refresh count;

storing within columns of said internal data structure of said internal session cache, by said NIE software application, said single session ID, said first session key, said first updated refresh count, said single session refresh period, and said first specified stale time;

retrieving, by said NIE software application, second credentials data associated with a first requestor of said plurality of requestors;

transmitting, by said NIE software application, said second credentials data to said resource server;

receiving, by said NIE software application from said resource server, a second session key associated with said resource server and said first requestor;

calculating, by said NIE software application, a second specified stale time associated with said second session key, wherein said calculating said second specified stale time comprises adding a first session refresh period of said session refresh periods to a second current time;

generating, by said NIE software application from a first refresh count of said refresh counts, a second updated refresh count;

removing from said internal session cache, by said NIE software application, said first specified stale time and said first updated refresh count; and storing within said internal session cache, by said NIE software application, a first session ID of said session IDs associated with said first requestor, said second session key, said first session refresh period, said second updated refresh count, and said second specified stale time.

10. The computing system of claim 9, wherein said method further comprises:

retrieving, by said NIE software application, third credentials data associated with a second requestor of said plurality of requestors;

transmitting, by said NIE software application, said third credentials data to said resource server;

receiving, by said NIE software application from said resource server, a third session key associated with said resource server and said second requestor;

calculating, by said NIE software application, a third specified stale time associated with said third session key, wherein said calculating said third specified stale time comprises adding a second session refresh period of said session refresh periods to a third current time;

generating, by said NIE software application from a second refresh count of said refresh counts, a third updated refresh count; and storing within said internal session cache, by said NIE software application, a second session ID of said session IDs associated with said second requestor, said third session key, said second session refresh period, said third updated refresh count, and said third specified stale time.

11. The computing system of claim 10, wherein said method further comprises:

detecting, by said NIE software application, that said first master refresh period has expired;

transmitting, by said NIE software application to said resource server, a first request for a new session key;

retrieving, by said NIE software application from said internal session cache, said third session key;

transmitting, by said NIE software application to said resource server, said third session key;

receiving, by said NIE software application from said resource server in response to said first request, a fourth session key associated with said resource server and said second requestor;

calculating, by said NIE software application, a fourth specified stale time associated with said fourth session key, wherein said calculating said fourth specified stale time comprises adding a third session refresh period of said session refresh periods to a fourth current time;

generating, by said NIE software application from a third refresh count of said refresh counts, a fourth updated refresh count;

removing, by said NIE software application from said internal session cache, said third updated refresh count, and said third specified stale time; and storing within said internal session cache, by said NIE software application, said fourth session key, said third updated refresh count, and said fourth specified stale time.

12. The computing system of claim 10, wherein said method further comprises:

establishing, by said NIE software application, a first trust relationship between said NIE software application and said second requestor;

receiving, by said NIE software application from said second requestor, a first resource request for retrieving a first resource from said resource server;

retrieving, by said NIE software application from said internal session cache, said third session key;

transmitting, by said NIE software application to said resource server, said first resource request and said third session key;
receiving, by said NIE software application from said resource server in response to said first resource request, a fourth session key and a first resource;
calculating, by said NIE software application, a fourth specified stale time associated with said fourth session key, wherein said calculating said fourth specified stale time comprises adding a third session refresh period of said session refresh periods to a fourth current time;
generating, by said NIE software application from a third refresh count of said refresh counts, a fourth updated refresh count;
removing, by said NIE software application from said internal session cache, said third specified stale time and said third updated refresh count;
storing within said internal session cache, by said NIE software application, said fourth session key, said fourth updated refresh count, and said fourth specified stale time; and
transmitting, by said NIE software application, said first resource to said second requester.

13. The computing system of claim 9, wherein said method further comprises:
detecting, by said NIE software application, that said first master refresh period has expired;
transmitting, by said NIE software application to said resource server, a first request for a new session key;
retrieving, by said NIE software application from said internal session cache, said second session key;
transmitting, by said NIE software application to said resource server, said second session key;
receiving, by said NIE software application from said resource server in response to said first request, a third session key associated with said resource server and said first requestor;
calculating, by said NIE software application, a third specified stale time associated with said third session key, wherein said calculating said third specified stale time comprises adding a second session refresh period of said session refresh periods to a third current time;
generating, by said NIE software application from a second refresh count of said refresh counts, a third updated refresh count;
removing, by said NIE software application from said internal session cache, said second updated refresh count, and said second specified stale time; and
storing within said internal session cache, by said NIE software application, said third session key, said third updated refresh count, and said third specified stale time.

14. The computing system of claim 9, wherein said method further comprises:
establishing, by said NIE software application, a first trust relationship between said NIE software application and said first requestor;
receiving, by said NIE software application from said first requestor, a first resource request for retrieving a first resource from said resource server;
retrieving, by said NIE software application from said internal session cache, said second session key;
transmitting, by said NIE software application to said resource server, said first resource request and said second session key;
receiving, by said NIE software application from said resource server in response to said first resource request, a third session key and a first resource;
calculating, by said NIE software application, a third specified stale time associated with said third session key, wherein said calculating said third specified stale time comprises adding a second session refresh period of said session refresh periods to a third current time;
generating, by said NIE software application from a second refresh count of said refresh counts, a third updated refresh count;
removing, by said NIE software application from said internal session cache, said second specified stale time and said second updated refresh count;
storing within said internal session cache, by said NIE software application, said third session key, said third updated refresh count, and said third specified stale time; and
transmitting, by said NIE software application, said first resource to said first requester.

15. The computing system of claim 9, wherein said method further comprises:
establishing, by said NIE software application, a first trust relationship between said NIE software application and a first requestor, wherein said plurality of requestors does not comprise said first requestor;
receiving, by said NIE software application from said first requestor, a first resource request for retrieving a first resource from said resource server;
retrieving, by said NIE software application from said internal session cache, said first session key;
transmitting, by said NIE software application to said resource server, said first resource request and said first session key;
receiving, by said NIE software application from said resource server in response to said first resource request, a second session key and a first resource;
calculating, by said NIE software application, a second specified stale time associated with said second session key, wherein said calculating said second specified stale time comprises adding said single session refresh period to a second current time;
generating, by said NIE software application from said first updated refresh count, a second updated refresh count;
removing, by said NIE software application from said internal session cache, said first specified stale time and said first updated refresh count;
storing within said internal session cache, by said NIE software application, said second session key, said second updated refresh count, and said second specified stale time; and
transmitting, by said NIE software application, said first resource to said first requester.

16. The computing system of claim 9, wherein said method further comprises:
detecting, by said NIE software application, that said first master refresh period has expired;
transmitting, by said NIE software application to said resource server, a first request for a new session key;
retrieving, by said NIE software application from said internal session cache, said first session key;
transmitting, by said NIE software application to said resource server, said first session key;
receiving, by said NIE software application from said resource server in response to said first request, a second session key associated with said resource server and said first requestor;
calculating, by said NIE software application, a second specified stale time associated with said second session key, wherein said calculating said second specified stale time comprises adding said single session refresh period to a second current time;
generating, by said NIE software application from said first updated refresh count, a second updated refresh count;
removing, by said NIE software application from said internal session cache, said first updated refresh count, and said first specified stale time; and
storing within said internal session cache, by said NIE software application, said second session key, said second updated refresh count, and said second specified stale time.

17. The method of claim 1, further comprising:
providing at least one support service for at least one of creating, integrating, hosting, maintaining, and deploying computer-readable code in said computing system, wherein the code in combination with the computing system is capable of performing: said initializing, said transmitting said notification message, said retrieving said first configuration data, said retrieving said second configuration data, said calculating said first master refresh period, said retrieving, said first credentials data, said transmitting said first credentials data, said calculating said first specified stale time, said generating said first updated refresh count, and said storing said single session ID.

18. A computer program product, comprising a computer readable storage device storing a computer readable program code, said computer readable program code comprising an algorithm that when executed by a computer processor of a computing system implements a method comprising:
initializing, by said computing system, said NIE software application, wherein said NIE software application comprises an internal session cache and internal logic configured to maintain a validity of session keys so that multiple subsequent resource requests may be immediately serviced without a need to authenticate all requests from a requestor, wherein said internal logic determines a validity of session key values passed to it by said NIE software application when said NIE software application requests resources on behalf of a requestor, and wherein the internal session cache comprises an internal data structure within said NIE software application;
transmitting, by said NIE software application to an administrator of said computing system, a notification message indicating said initializing;
retrieving, by said NIE software application, first configuration data associated with said NIE software application, wherein said first configuration data consists of a single refresh count associated with first session key requests, a single session refresh period associated with said first session key requests, and a single session ID associated with said NIE software application, and wherein said single refresh count comprises a number of iterations in which said NIE software application will continue to make light-weight calls to a resource server in order to refresh a session key for a current session for each requestor;
retrieving, by said NIE software application, second configuration data associated with a plurality of requestors, wherein said second configuration data comprises refresh counts associated with second session key requests, session refresh periods associated with said second session key requests, and session IDs associated with said plurality of requestors;
calculating, by said computer processor executing said NIE software application, a first master refresh period from said session refresh periods and said single session refresh period, wherein said calculating said first master refresh period comprises:
scanning said session refresh periods;
selecting a first session refresh period from said session refresh periods, said first session refresh period comprising a smallest value as compared to all other of said session refresh periods; and
subtracting a specified time period from said first session refresh period;
retrieving, by said NIE software application from an external secure credentials storage device, first credentials data associated with said NIE software application, wherein said first credentials data consists of a user ID and password for said NIE software application, and wherein said first credentials data is hardcoded within source code of said NIE software application;
transmitting, by said NIE software application, said first credentials data to a resource server to generate an authentication attempt;
receiving, by said NIE software application, a result value indicating a result of said authentication attempt;
receiving, by said NIE software application from said resource server, a first session key as a result of said authentication attempt being successful, wherein said first session key comprises a string of characters for accessing resources in said resource server, and wherein said first session key comprises an encoded reset lifetime;
repeatedly running, by said NIE software application, an iterative process with respect to the internal session cache in order currently validate all stored session keys with respect to said resource server and an authentication system, wherein each refresh count in the internal session cache indicates how many times an associated session key may be obtained by making a light weight call to said resource server, wherein resource server returns new session keys, wherein each key of said new session keys is obtained by passing a valid almost expired session key to said resource server, and wherein said iterative process continues until a pre-configured refresh count has been obtained;
calculating, by said NIE software application, a first specified stale time associated with a date and time at which a validity of said first session key will expire, wherein said calculating said first specified stale time comprises adding said single session refresh period to a first current time, and wherein said encoded reset lifetime is greater than said first specified stale time;
generating, by said NIE software application from said single refresh count, a first updated refresh count;
storing within columns of said internal data structure of said internal session cache, by said NIE software application, said single session ID, said first session key, said first updated refresh count, said single session refresh period, and said first specified stale time;
retrieving, by said NIE software application, second credentials data associated with a first requestor of said plurality of requestors;
transmitting, by said NIE software application, said second credentials data to said resource server;
receiving, by said NIE software application from said resource server, a second session key associated with said resource server and said first requestor;
calculating, by said NIE software application, a second specified stale time associated with said second session key, wherein said calculating said second specified stale time comprises adding a first session refresh period of said session refresh periods to a second current time;

generating, by said NIE software application from a first refresh count of said refresh counts, a second updated refresh count;

removing from said internal session cache, by said NIE software application, said first specified stale time and said first updated refresh count; and storing within said internal session cache, by said NIE software application, a first session ID of said session IDs associated with said first requestor, said second session key, said first session refresh period, said second updated refresh count, and said second specified stale time.

* * * * *